(12) United States Patent
Arnold et al.

(10) Patent No.: US 6,792,755 B2
(45) Date of Patent: Sep. 21, 2004

(54) HIGH-PRESSURE RATIO TURBOCHARGER

(75) Inventors: Steven Don Arnold, Rancho Palos Verdes, CA (US); Gary Vrbas, Wilmington, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/430,466

(22) Filed: May 5, 2003

(65) Prior Publication Data

US 2004/0020203 A1 Feb. 5, 2004

Related U.S. Application Data

(60) Provisional application No. 60/400,024, filed on Jul. 30, 2002.

(51) Int. Cl.[7] .............................................. F02D 23/00
(52) U.S. Cl. .................... 60/602; 60/605.1; 415/173.1; 415/170.1; 415/206; 415/102
(58) Field of Search ............................... 60/602, 605.1; 417/407; 415/173.1, 170.1, 203, 204, 205, 206, 101, 102

(56) References Cited

U.S. PATENT DOCUMENTS

| | | | | |
|---|---|---|---|---|
| 1,105,967 A | * | 8/1914 | Davidson | 415/206 |
| 1,163,778 A | * | 12/1915 | Scheurmann | 415/206 |
| 2,944,785 A | * | 7/1960 | Sampietro | 415/170.1 |
| 3,173,241 A | * | 3/1965 | Birmann | 60/605.1 |
| 3,175,756 A | * | 3/1965 | Freevol | 415/206 |
| 4,032,262 A | | 6/1977 | Zehnder | |
| 4,155,684 A | | 5/1979 | Curiel | |
| 5,025,629 A | | 6/1991 | Woollenweber | |
| 6,062,028 A | | 5/2000 | Arnold | |

FOREIGN PATENT DOCUMENTS

JP          05106459 A   *   4/1993   ........... F02B/39/00

* cited by examiner

*Primary Examiner*—Thomas Denion
*Assistant Examiner*—Thai Ba Trieu
(74) *Attorney, Agent, or Firm*—Ephraim Starr Grant Langton

(57) ABSTRACT

A high-pressure ratio turbocharger of this invention has a two-stage compressor section comprising a first-stage compressor impeller rotatably disposed in a first compressor housing, and a second-stage compressor impeller rotatably disposed in a second compressor housing. The first and second stage compressor impellers are attached to a common shaft, and are positioned within respective compressor housing in a direction facing away from one another. A portion of the second compressor housing is formed from a compressor backplate attached to a turbocharger center housing. A scroll seal is disposed between the first and second compressor housings, and is interposed between the impellers to separate outlet air flow between each respective first and second compressor chamber.

5 Claims, 1 Drawing Sheet

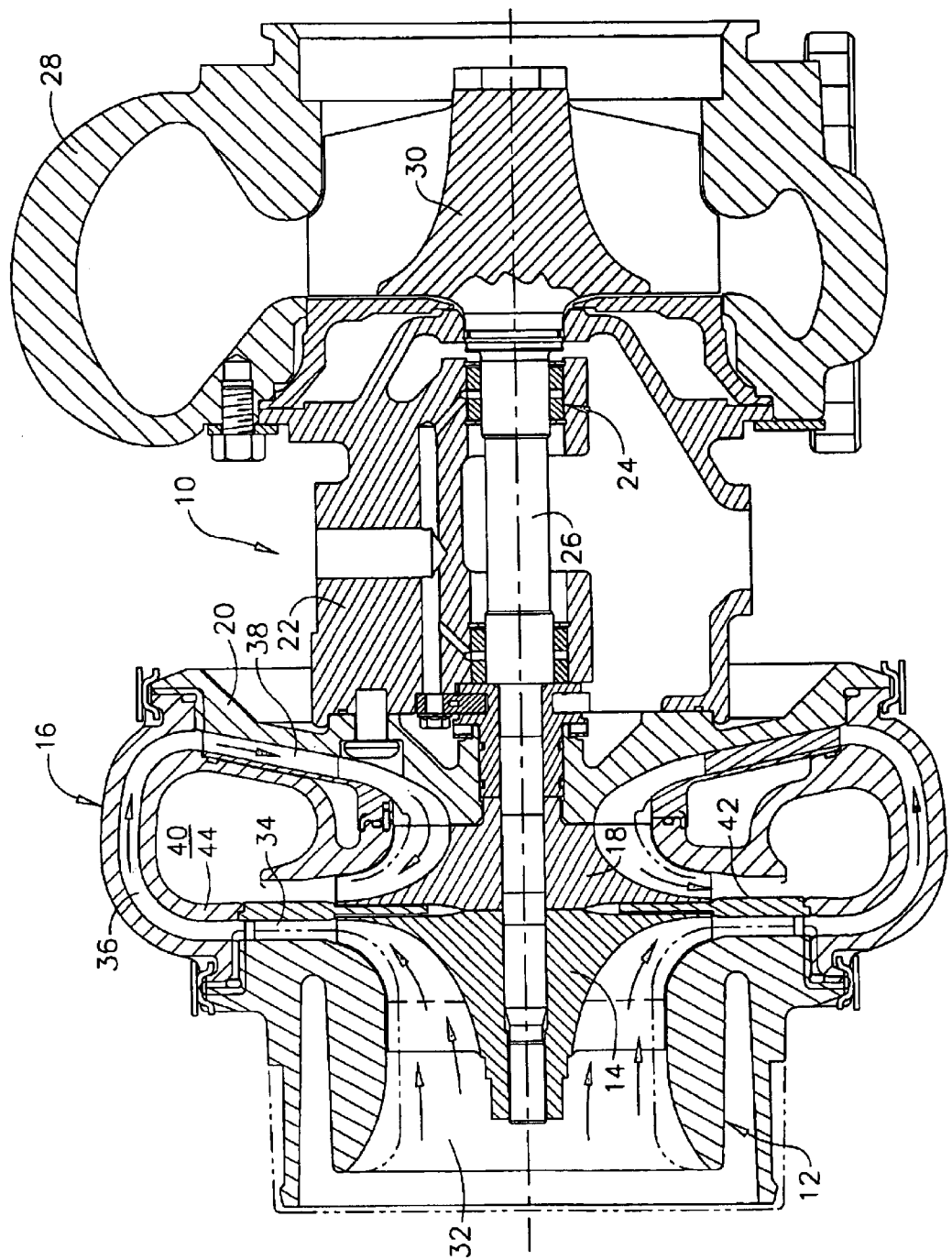

HIGH-PRESSURE RATIO TURBOCHARGER

RELATION TO COPENDING PATENT APPLICATION

This patent application claims priority of U.S. provisional patent application No. 60/400,024 that was filed on Jul. 30, 2002.

FIELD OF THE INVENTION

The present invention relates to turbochargers and, more particularly, to turbocharger comprising a two-stage compressor section that is configured to provide a higher pressure ratio operating condition than possible with a conventional single-stage compressor turbocharger.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing.

The exhaust gas-driven turbine is mounted onto one end of a shaft that is common to a radial air compressor impeller mounted onto an opposite end of that shaft. Thus, rotary action of the turbine also causes the air compressor impeller to spin within a compressor housing of the turbocharger that is separate from the exhaust housing. The spinning action of the air compressor impeller causes intake air to enter the compressor housing and be pressurized or boosted a desired amount before the air is mixed with fuel and combusted within the engine combustion chamber.

The turbocharger turbine section comprises a turbine wheel, a wheel heat shroud, and a turbine housing. The turbine exhaust gas inlet is positioned along an outer diameter portion of the turbine housing. The turbine is a centripetal radial, or mixed inflow device in that exhaust gas flows inward, past the wheel blades, and exits at the center of the housing's diameter. Expanded engine exhaust gas is directed through the engine exhaust gas manifold into the turbine housing. The exhaust gas pressure and the heat energy extracted from the gas causes the turbine wheel and attached shaft to rotate, which drives the compressor impeller.

In a traditional turbocharger, the turbocharger compressor section comprises a compressor impeller, a backplate, and a compressor housing. The compressor air inlet is positioned at the center of the compressor housing diameter. It is a centrifugal, or radial-outflow device in that the air flows outward, past the impeller blades, and exits at the outer diameter of the housing. The rotating compressor wheel draws ambient air through the engine's air filtration system. The blades of the impeller accelerate and expel the air into the compressor housing where it is compressed and directed through ducting to the engine intake manifold.

A central housing and rotating assembly supports the common compressor impeller the turbine wheel shaft in a bearing assembly or system. Seals separate the center housing from both the turbine and compressor housings.

Conventional turbochargers comprise a single compressor impeller disposed within the compressor housing. Such single-stage compressors are known to provide a fixed pressure ratio at operating conditions that may not produce a desired level of pressurized air or boost at low RPM engine conditions.

It is, therefore, desired that a turbocharger be constructed in a manner that provides a higher pressure ratio, than conventional single-stage compressor turbochargers, at operating conditions that functions to provide a desired amount of pressurized air at low RPM engine conditions, thereby expanding the practical operating window of the turbocharger.

SUMMARY OF THE INVENTION

The present invention is directed to a high-pressure ratio turbocharger having a twostage compressor section. According to an exemplary embodiment of the present invention, the turbocharger has a rotatable shaft with a first end and a second end. A turbine wheel is coupled to the first end of the rotatable shaft and is disposed within a turbine housing.

A first compressor impeller is coupled to the second end of the rotatable shaft and is disposed in a first compressor housing comprising an air inlet and a pressurized air outlet. A second compressor impeller is coupled to the shaft adjacent the first compressor impeller and is disposed within a second compressor housing. The second compressor housing is configured to receive pressurized air from the first compressor housing, and direct pressurized air outwardly therefrom to an intake system of an internal combustion engine.

In an embodiment of the present invention, the second compressor impeller faces in an opposite direction to the first compressor impeller. The first and second compressor impellers can be provided in the form of a one-piece construction, or as a two-piece construction.

A scroll seal is positioned between the first and second compressor impellers, and between the first and second compressor chamber, and an air flow wall is coupled to the scroll seal and to the second compressor housing. The second compressor housing is in part formed from a compressor backplate that is attached to a turbocharger center housing. The scroll seal, the second compressor housing, and the air flow wall operate to form passageway for directing pressurized air from the first compressor impeller to the second compressor impeller.

In an additional embodiment, the air flow wall also forms a radial diffuser for the second compressor impeller. In another embodiment, the air flow wall forms a volute outlet for the second compressor housing. In yet another embodiment, the air flow wall is configured having inlet guide vanes.

BRIEF DESCRIPTION OF THE DRAWING

These and other features and advantages of the present invention will be appreciated as the same becomes better understood by reference to the following detailed description when considered in connection with the accompanying drawings wherein FIG. 1 is a cross-sectional view of a turbocharger comprising a two-stage compressor section according to principles of this invention.

DETAILED DESCRIPTION OF THE INVENTION

High-pressure ratio turbochargers, constructed according to principles of this invention, comprise a two-stage compressor section that includes a first compressor impeller disposed within a first compressor housing, and a second compressor impeller disposed within a second compressor housing that is formed as part of a turbocharger backplate. Configured in this manner, turbochargers of this invention provide higher pressure ratio operating conditions than possible with conventional single-stage compressor turbocharger, in a turbocharger package that only moderately increased in length.

FIG. 1 illustrates an example high-pressure ratio turbocharger 10, constructed according to principles of the invention, comprising (moving from left to right) a first-stage compressor housing 12, and a first-stage compressor impeller 14 rotatably disposed therein. The first-stage compressor housing 12 is attached at one of its ends to a second-stage compressor housing 16 having a second-stage compressor impeller 18 disposed therein.

The second-stage compressor housing 16 is attached, at an axial end opposite from the first-stage compressor housing, to a compressor backplate 20. The compressor backplate 20 is coupled to a turbocharger center housing 22 that carries a bearing assembly 24 for accommodating rotational movement of a common shaft 26 disposed therein. The center housing is attached, at an end opposite from the backplate 20, to a turbine housing 28 that includes a turbine wheel 30 rotatably disposed therein.

Considering the various components in more detail, the first-stage compressor housing 12 includes an air inlet 32 that is oriented so that air entering the housing is delivered in an axial direction to the first-stage compressor impeller 14. The first-stage compressor impeller is coupled to the common shaft 26. As the first-stage compressor impeller 14 is rotated, by action of the turbine wheel 30 receiving exhaust gas directed to it through the turbine housing 28, thereby producing first-stage pressurized or boost air. The firststage pressurized air is routed in a radial direction through an outlet passage 34 in the first-stage compressor housing 12. The outlet passage 34 is configured to direct first-stage pressurized air to the second-stage compressor housing 16 for further pressurizing.

The second-stage compressor housing 16 is configured having an inlet volute 36 disposed therein along an outer wall portion of the housing surrounding the second-stage compressor impeller 18. The inlet volute 36 is configured to receive first-stage pressurized air, from the first-stage compressor housing outlet passage 34, and direct the air towards the second-stage compressor impeller 18.

In an example embodiment, and the inlet volute 36 is configured to deliver first-stage pressurized air to the second-stage compressor impeller in an axial direction. In a preferred embodiment, the second-stage compressor impeller 18 is oriented within the second-stage compressor housing in a direction that is opposite to that of the first-stage compressor impeller 14. Thus, the first-stage pressurized air is delivered to the second-stage compressor impeller 18 in a direction opposite to that of the air entering the first-stage compressor housing 12.

A portion of the second-stage compressor housing 16 is formed by the backplate 20. In an example embodiment, an inside surface of the backplate helps define an inlet volute section 38 that operates to direct the first-stage pressurized air second-stage compressor impeller 18. In an example embodiment, the backplate 20 is configured to incorporate a scroll inlet and a radial diffuser for the second-stage compressor housing 16. If desired, the second-stage compressor housing can be configured having inlet guide vanes disposed therein for the purpose of improving the inlet air condition to the second-stage compressor impeller.

The second-stage compressor impeller 18 is also attached to the common shaft 26 at a position on the shaft adjacent the first-stage compressor impeller 14. The first and second stage compressor impellers can be provided in the form of two separate members, or can be provided in the form of a one-piece construction. In an example embodiment, the compressor impellers are provided as separate members.

First-stage pressurized air that is routed to the second-stage compressor impeller 18 is further pressurized by operation of the rotational movement of the second-stage compressor impeller within the housing 16. Second-stage pressurized or boost air is directed away from the compressor impeller 18 in a generally radial direction and into an outlet volute 40 that is positioned radially inwardly of the inlet volute 36.

A scroll seal 42 is disposed within the second-stage compressor housing and extends radially therein from a position between the two compressor impellers 14 and 18, to a position that connects with an inside wall 44 defining the outlet volute 40. The scroll seal 42 operates to separate and seal the pressurized air flows of the first and second stage compressor impellers, and direct the respective pressurized air flows into the respective inlet and outlet volutes 36 and 40 of the second-stage compressor housing 16.

The second-stage pressurized air entering the outlet volute 40 exists the second-stage compressor housing in conventional fashion for subsequent routing to an intake system of an internal combustion engine and combustion.

A feature of high-pressure ratio turbochargers of this invention is that the manner of construction, i.e., forming a second-stage compressor housing from a portion of the compressor backplate, provides: (1) a package size that is not appreciably longer than a conventional single-stage turbocharger; and (2) a two-stage turbocharger construction that does little impact on the shaft bearing system.

High-pressure ratio turbochargers, constructed in accordance with principles of this invention, provide a higher pressure ratio operating condition than is possible with single-stage compressor turbochargers, and improve the range of operation experienced by a single-stage compressor turbochargers near the extremes of its operating envelope. Other advantages include reduced bearing losses, reduced noise, and improved turbine efficiency through reduced specific speed.

Having now described the invention in detail as required by the patent statutes, those skilled in the art will recognize modifications and substitutions to the specific embodiments disclosed herein. Such modifications are within the scope and intent of the present invention.

What is claimed is:

1. A turbocharger for an internal combustion engine, the turbocharger comprising:

a rotatable shaft disposed within a center housing and having a first end and a second end;

a turbine housing attached to one end of the center housing and having a turbine wheel disposed therein and attached to first end of the rotatable shaft;

a compressor backplate attached to an opposite end of the center housing;

a first compressor housing attached to compressor backplate impeller and comprising a first compressor impeller rotatably disposed therein and attached to the shaft;

a second compressor housing attached to the first compressor housing and comprising a second compressor impeller rotatably disposed therein and attached the shaft second end; and a scroll seal interposed between the first and second compressor impellers and extending radially outwardly between the first and second compressor housings.

2. The turbocharger as recited in claim 1 wherein the second compressor housing includes an air outlet passage, and the first compressor housing includes an air outlet volute, and wherein the scroll seal separates the air outlet passage from the air outlet volute.

3. The turbocharger as recited in claim 1 wherein the first compressor impeller and the second compressor impeller are facing in opposite directions.

4. The turbocharger as recited in claim 1 wherein the first compressor impeller and the second compressor impeller are formed as separate members.

5. The turbocharger as recited in claim 1 wherein the first compressor housing includes an inlet volute that is in air flow communication with an outlet passage from the second compressor chamber, and wherein a wall section of the inlet volute is formed by the compressor backplate.

* * * * *